United States Patent
Beattie, Jr. et al.

(10) Patent No.: US 10,106,045 B2
(45) Date of Patent: Oct. 23, 2018

(54) METHODS AND APPARATUS TO CHARGE A VEHICLE AND TO FACILITATE COMMUNICATIONS WITH THE VEHICLE

(71) Applicant: AT&T Intellectual Property I, L.P., Atlanta, GA (US)

(72) Inventors: James Gordon Beattie, Jr., Bergenfield, NJ (US); Stephen Francis Triano, Hillsborough, NJ (US); Roque Rios, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 529 days.

(21) Appl. No.: 14/524,953

(22) Filed: Oct. 27, 2014

(65) Prior Publication Data
US 2016/0114686 A1    Apr. 28, 2016

(51) Int. Cl.
*B60L 11/18*    (2006.01)

(52) U.S. Cl.
CPC ......... *B60L 11/182* (2013.01); *B60L 11/1838* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC .................................................. B60L 11/182
USPC ....................................................... 320/108
See application file for complete search history.

(56) References Cited

U.S. PATENT DOCUMENTS

| | | | |
|---|---|---|---|
| 4,800,328 A | 1/1989 | Bolger et al. |
| 5,311,973 A | 5/1994 | Tseng et al. |
| 5,821,731 A | 10/1998 | Kuki et al. |
| 6,583,603 B1 | 6/2003 | Baldwin |
| 6,963,728 B2 | 11/2005 | Edwards et al. |

(Continued)

FOREIGN PATENT DOCUMENTS

| | | | |
|---|---|---|---|
| WO | 9414252 | | 6/1994 |
| WO | WO9414252 | * | 6/1994 |

OTHER PUBLICATIONS

"EGVI-Unplugged-Inductive charging for Electric Vehicles," [retrieved from Internet at http://www.egvi.eu/projects/13/38/Unplugged-Inductive-charging-for-Electric-Vehicles-Feb. 2014 on Feb. 2014] (4 pages).

(Continued)

*Primary Examiner* — Samuel Berhanu
*Assistant Examiner* — Tessema Kebede
(74) *Attorney, Agent, or Firm* — Hanley, Flight and Zimmerman, LLC (57) ABSTRACT

Example methods and apparatus to facilitate communication between a charging station and a vehicle are disclosed. An example apparatus includes a first charging interface to communicatively couple with a second charging interface of a charging station. The example apparatus also includes a communication interface actuatable between a stored position and a deployed position, the communication interface comprising a first radio frequency waveguide, the first radio frequency waveguide to physically engage a second radio frequency waveguide of the charging station to form a electromagnetically sealed waveguide, the electromagnetically sealed waveguide to guide radio frequency communication signals between the communication interface and the charging station.

16 Claims, 5 Drawing Sheets

(56) References Cited

U.S. PATENT DOCUMENTS

| | | | |
|---|---|---|---|
| 7,221,236 B2 | 5/2007 | Liess et al. | |
| 7,880,337 B2 | 2/2011 | Farkas | |
| 8,008,888 B2 | 8/2011 | Oyobe et al. | |
| 8,519,569 B2 | 8/2013 | Shimokawa | |
| 8,610,399 B2 | 12/2013 | Takada et al. | |
| 8,651,208 B2 | 2/2014 | Ichikawa | |
| 8,798,829 B2 | 8/2014 | Ichikawa | |
| 2010/0225271 A1* | 9/2010 | Oyobe | B60L 5/005 320/108 |
| 2011/0221387 A1* | 9/2011 | Steigerwald | B60L 11/182 320/108 |
| 2011/0254503 A1* | 10/2011 | Widmer | B60L 11/182 320/108 |
| 2011/0285349 A1* | 11/2011 | Widmer | B60L 11/182 320/108 |
| 2012/0119575 A1 | 5/2012 | Kurs et al. | |
| 2013/0037339 A1 | 2/2013 | Hickox | |
| 2013/0041850 A1 | 2/2013 | LaFrance | |
| 2013/0154553 A1 | 6/2013 | Steele | |
| 2013/0328387 A1 | 12/2013 | Venkateswaran et al. | |
| 2014/0021908 A1* | 1/2014 | McCool | B60L 11/182 320/108 |
| 2014/0021915 A1* | 1/2014 | Staley | H01R 13/635 320/109 |
| 2014/0035520 A1 | 2/2014 | Nakayama | |
| 2014/0132208 A1 | 5/2014 | Fisher | |
| 2014/0159479 A1 | 6/2014 | Nomura et al. | |
| 2014/0203768 A1* | 7/2014 | Andic | H02J 7/00 320/108 |

OTHER PUBLICATIONS

Honig, Zach, "Nissan Leaf to get inductive charging, lost its stem in 2013 (video)," [retrieved from Internet at http://www.engadget.com/2011/2015/nissan-leaf-to-get-inductive-charging-lost-its-stem-in-2013-vi/ on 2013] (2 pages).

Singh, Timon, "Volvo is Developing a Wireless Inductive Charging Pad for Electric Vehicles," [retrieved from internet at http://inhabitat.com/volvo-is-working-on-a-wireless-inductive-charging-pad-for-electric-vehicles/print/ on Oct. 25, 2013] (3 pages).

Ferro et al., "Wireless Inductive Charging," Tesla Unplugged, [retrieved from internet at http://www.eng.utah.edu/~zwilcox/senior_project/] (14 pages).

\* cited by examiner

METHODS AND APPARATUS TO CHARGE A VEHICLE AND TO FACILITATE COMMUNICATIONS WITH THE VEHICLE

FIELD OF THE DISCLOSURE

This disclosure relates generally to electric vehicles, and, more particularly, to methods and apparatus to facilitate communication between a vehicle and a charging station.

BACKGROUND

Electric vehicles, such as plug-in hybrid electric vehicles (e.g., the Toyota Prius, the Chevy Volt, etc.) and all-electric vehicles (e.g., the Tesla Model S, the Volkswagen E-Golf, etc.) use an electric motor that drives the transmission of the vehicle. In such a vehicle, one or more energy storage devices (e.g., batteries) provide power to one or more electric motors through an electric motor controller. Over time, the batteries discharge and must be recharged for subsequent use. Charging stations may be installed in homes, parking garages, and parking lots, etc. to allow electric vehicles to be charged while parked.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Examples disclosed herein may be used to facilitate communication and electrical power transfer between a vehicle and a charging station. For instance, examples disclosed herein may be used to implement structures that facilitate electrically and communicatively coupling a vehicle to a charging station to enable charging of the vehicle's battery or batteries while concurrently enabling data communications between the vehicle and the charging station. Such concurrent charging and data communication are enabled by example electrical charging interfaces and example communication interfaces disclosed herein that can be operated and connected substantially easier and with relatively less user intervention than traditional charging connectors. Traditional power connectors (e.g., IEC 62196 compliant connectors, Chademo connectors, etc.) for vehicles resemble fuel hoses that require a driver to get out of the vehicle, open a hatch, and insert the power cable into the vehicle. However, such power connectors have limited life cycles due to their physical interface with the vehicle. In addition, the operability of such power connectors is affected by environmental factors such as weather (e.g., rain, snow, ice, wind, etc.) and temperature. Additionally, such power connectors do not provide a data connection with the vehicle. For example, instead of a data connection, IEC 62196 compliant connectors use one or more signaling pins (e.g., pilot control, etc.) to communicate the state of the battery. As used herein, a data connector is defined to be a connector that facilitates bi-directional communication through a wired or wireless connection.

Example methods, apparatus, and articles of manufacture disclosed herein may be used to implement a charging station and a corresponding on-vehicle charging and communication system to simultaneously provide a charging interface and a data interface between the charging station and the vehicle. In some examples, the on-vehicle charging and communication system allows a parked vehicle to inductively receive power from a charging interface embedded in a surface (e.g., a floor, a wall, a ceiling, a kiosk, a pylon, etc.) of a parking space (e.g., in a parking lot, in a parking garage, in a personal garage, etc.). In some examples, data communication between the on-vehicle computing system of the vehicle and the charging station are enabled by transferring data through wireless transmissions via a shielded radio frequency connection such as an electromagnetically sealed radio frequency waveguide connection. Alternatively, data may be transferred through an Enhanced Near Field Communication (ENFC) or Near Field Communication (NFC) interface.

In some disclosed examples, the on-vehicle charging system is in communication with a controller area network (CAN) bus of the on-vehicle computing system. In some examples, the on-vehicle charging system communicates with an in-vehicle computer having a dashboard display and/or a media console. In some examples, the on-vehicle charging system communicates with the on-vehicle computer to provide visual indicators and/or audio indicators via the dashboard display, the media console, and/or speakers to assist the driver to position the vehicle relative to the charging station's charging interface. In some examples, after a driver positions the vehicle in the general vicinity of the charging interface of the charging station, the vehicle steers itself into a suitable position relative to the charging interface so that a charging interface of the vehicle connects (physically and/or wirelessly) with the charging interface of the charging station. In some examples, when the vehicle's charging interface is located relatively close to the charging station's charging interface, the vehicle's charging interface and/or communication interface may move at small increments relative to the parked vehicle to align with the charging interface and a communication interface of the charging station without needing to move the entire vehicle.

In some disclosed examples, the vehicle communication interface of the on-vehicle charging system extends from an underside of the vehicle and engages a charging station communication interface. In some examples, if the vehicle communication interface is misaligned with the charging station communication interface, the vehicle communication interface rotates about its normal axis and/or translates (e.g., moves left, right, forward and/or back, etc.) to align itself with the charging station communication interface before engaging the charging station communication interface.

Figure 1:
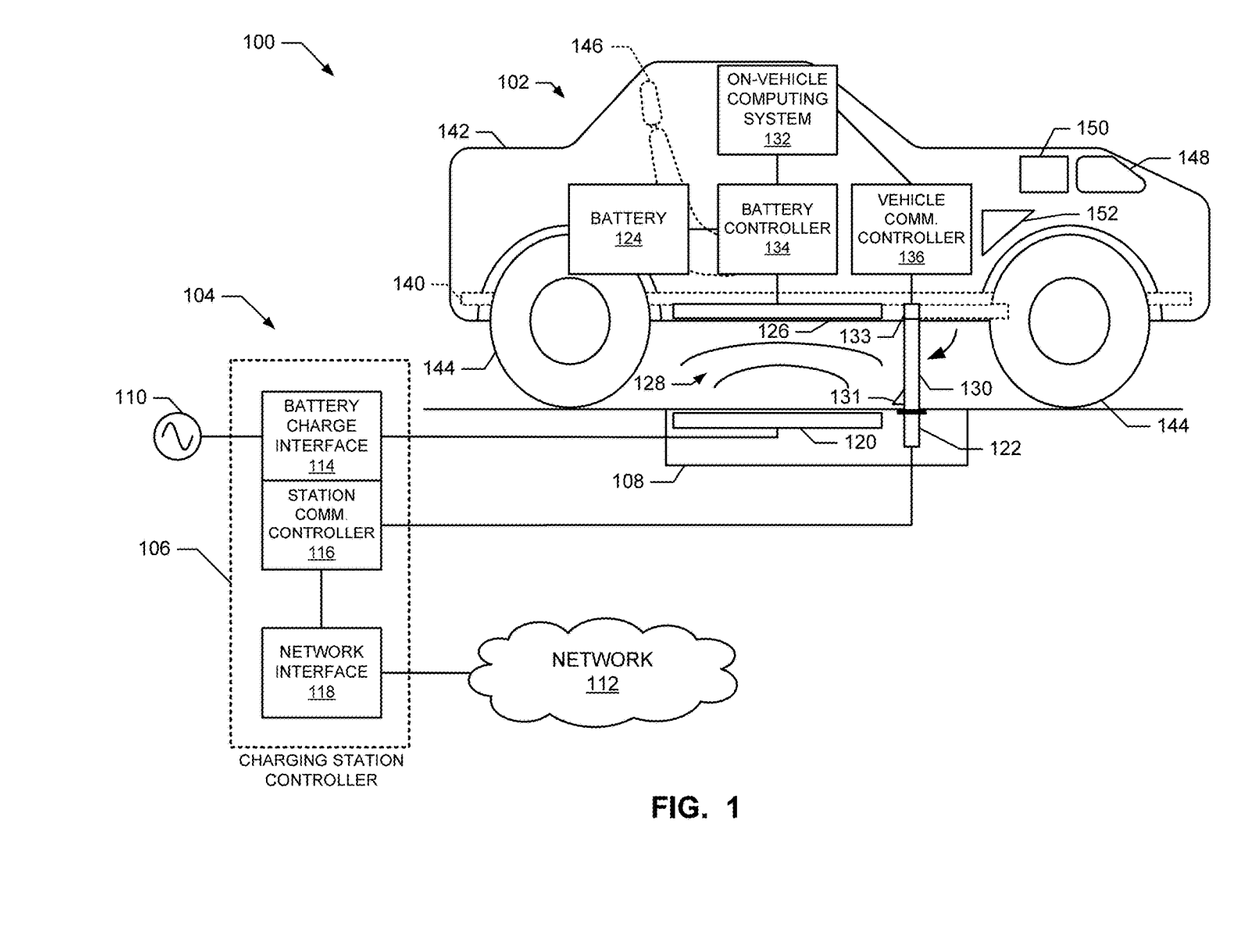
FIG. 1 illustrates an example system constructed in accordance with the teaching of this disclosure to charge a vehicle battery and to facilitate communication between a vehicle and a charging station.

FIG. 1 illustrates an example system 100 constructed in accordance with the teaching of this disclosure to facilitate communication between a vehicle 102 and a charging station 104 and to, at the same time, facilitate charging a battery 124 of the vehicle 102. In the illustrated example of FIG. 1, the charging station 104 includes an example charging station controller 106 and an example charging pad 108. The example charging station controller 106 controls inputs and/or outputs of the charging station 104. For example, the charging station controller 106 of FIG. 1 controls electricity provided by an alternating current (AC) power source 110 (e.g., $120/240V_{AC}$ at 60 Hz, $220V_{AC}$ at 50 Hz, etc.), data exchange via a network 112, etc. The charging pad 108 of the illustrated example communicatively couples with the vehicle 102 to provide power to the vehicle 102 and/or to facilitate communicating data between the charging station 104 and the vehicle 102. Although shown separate in the example of FIG. 1, in some examples, the charging controller 106 and the charging pad 108 are housed in one physical unit. In some examples, the station charge interface 126 and the station communication interface 122 are adjacent to each other in the charging pad 108.

In the illustrated example of FIG. 1, the charging station controller 106 includes an example battery charge interface 114, an example station communication controller 116, and an example network interface 118. In the illustrated example, the battery charge interface 114 controls delivery of electrical current to a station charging interface 120 in the charging pad 108. In some examples, the battery charge interface 114 converts the AC electricity from the AC power source 110 into direct current (DC) electricity. In some examples, the battery charge interface 114 isolates the electric current supplied to the station charging interface 120 from the AC power source 110. In some examples, the battery charge interface 114 inverts (e.g. via a power inverter) the DC electricity and provides the inverted DC electricity to the station charging interface 120 to create an alternating electromagnetic magnetic field 128. The alternating magnetic field 128 generated by the station charging interface 120 induces a current on the vehicle charging interface 126 used to recharge the batteries 124. In some examples, the battery charge 114 interface adjusts the frequency of the alternated and/or modulated current to match the resonant frequency of a vehicle charging interface 126 of the vehicle 102.

The battery charge interface 114 of the illustrated example supplies electrical current to the station charging interface 120 depending on the status of one or more batteries 124 of the vehicle 102. In some examples, the battery charge interface 114 receives status information (e.g., discharged, partially charged, fully charged, do not charge, etc.) of the batteries 124, via the station communication controller 116, to determine whether to supply electrical current to the station charging interface 120. For example, the battery charge interface 114 supplies electrical current when the batteries 124 are discharged or partially charged. To save power, the example battery charge interface 114 does not supply electrical current when the batteries 124 are fully charged or when the status indicates that the batteries 124 are not to be charged.

In some examples, the charging pad 108 includes a sensor (e.g., a weight sensor, an infra-red sensor, an Eddy current sensor, an optical sensor, etc.) to detect that the vehicle 102 is proximate the charging pad 108. In some such examples, in response to detecting the vehicle 102, the battery charge interface 114 supplies electrical current to the station charging interface 120 to produce a relatively weak electromagnetic field 128 (e.g., an electromagnetic field that is strong enough to be detectable, but not strong enough to supply power to recharge a battery). In some examples, the vehicle communication controller 136 of the vehicle 102 uses the relatively weak electromagnetic field 128 to detect when the vehicle 102 is suitably positioned proximate the charging pad 108. In such a manner, the vehicle 102 can detect being proximate the charging pad 108.

In the illustrated example of FIG. 1, the station communication controller 116 manages data communication between the network interface 118 and the station communication interface 122. For example, the station communication controller 116 receives data from the vehicle 102 and converts the data into a format to be used by the network interface 118 to communicate the data via the network 112. Additionally, the station communication controller 116 receives data from the network interface 118 (e.g., data received at the charging station controller 106 via the network 112) and converts the data into a format to be sent to the vehicle 102 via the station communication interface 122. In some examples, the station communication controller 116 supplies the power to drive the station communication interface 122 (e.g., supplies power to a Near Field Communication (NFC) circuit, supplies power to an antenna, etc.).

In the illustrated example of FIG. 1, the network interface 118 of the illustrated example is communicatively connected to a network 112 (e.g., the Internet, a local area network, a wide area network, etc.) via a wired and/or wireless connection (e.g., an IEEE 802.11 wireless connection, a Bluetooth connection, a cable/DSL/satellite modem, a cell tower, etc.). In some examples, the network interface may be implemented as a gateway and/or a router. The network interface 118 of the illustrated example maintains network information (e.g., a network address, network settings, etc.) required to send and/or receive data over the network 112. The example network interface 118 sends data to and/or receives data from the example station communication controller 116. In some examples, the charging station 104 may communicate with different network entities (e.g., a car manufacturer, a telecommunication service provider, an internet service provider, a media provider, etc.) via the network 112 to send data from the vehicle 102 to the network entities and/or receive data from the network entities for delivery to the vehicle. In addition, the charging station 104 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the charging station 104 via the network 112 may display information, such as the battery status, the charging status, diagnostic data, media files (e.g., movies, music, television programs, etc.) uploaded to a memory of the vehicle 102, firmware versions, software versions, etc. In some examples, a user, through a computing device connected to the charging station 104, may issue commands to the charging station 104 and/or the vehicle 102. For example, the user may upload or delete media files, update firmware and/or software, start the vehicle, turn off the vehicle, turn off the lights of the vehicle, turn on the lights of the vehicle, operate a vehicle climate control system, operate a vehicle alarm system, etc.

The example station charging interface 120 of the illustrated example is structured to communicatively couple to the vehicle charging interface 126 of the vehicle 102. In some examples, the station charging interface 120 is a primary inductive coil and the vehicle charging interface 126 is a secondary inductive coil adapted to cooperate when aligned so that the station charging interface 120 can inductively couple to the vehicle charging interface 126. The example station charging interface 120 receives electrical current from the AC power source 110 via the battery charge interface 114 to create an electromagnetic field 128. In some examples, the electrical current received from the AC power source 110 alternates at a frequency controlled by the battery charge interface 114 to create an alternating electromagnetic field 128.

In the illustrated example, the example station communication interface 122 engages an example vehicle communication interface 130. In some examples, the station communication interface 122 includes a radio frequency (RF) waveguide and an antenna to communicate data with the vehicle 102. When the vehicle communication interface 130 and the station communication interface 122 are in communication with one another, the example station communication controller 116 manages the exchange of data between the charging station controller 106 and the vehicle 102. In some examples, some types of data (e.g., system software/firmware, vehicle updates, etc.) or all data may be encrypted. Some advantages of encrypting the data include preventing a third-party from understanding data sent between the charging station controller 106 and the vehicle 102 (e.g., via eavesdropping on the data communication lines between the charging station controller 106 and the charging pad 108) and preventing the third-party from injecting malicious data into the communications.

In the illustrated example, the vehicle 102 includes an on-vehicle computing system 132, a battery controller 134, a battery 124, a vehicle communication controller 136, a secondary charging interface 126, and a vehicle communication interface 130. The example vehicle charging interface 126 (e.g., a secondary coil) communicatively couples (e.g., inductively couples) with the station charging interface 120 (e.g., a primary coil) of the charging station 104. The example battery controller 134 of the illustrated example manages or regulates charging of the battery 124. In the illustrated example, the vehicle charging interface 126 is on the underside of the vehicle 102. When the vehicle charging interface 126 is above the station charging interface 120 and the station charging interface 120 is active (e.g., generating the alternating electromagnetic field 128), current is induced in the vehicle charging interface 126 to delivery electricity to the battery controller 134 to charge the battery 124.

The battery controller 134 may use any suitable circuit to monitor the charge of the batteries 134 and/or manage the recharge cycle of the batteries 124. For example, the battery controller 134 may be designed to balance charge rate with battery life. To prevent overcharging, the battery controller 134 may detect a charge status of the battery 124 and enable or disable the electrical current (e.g. the current induced into the secondary charging interface 126) to the battery 124 based on the charge of the battery 124. In some examples, the battery controller 134 manages delivery of a trickle charge to the battery 124 by decreasing the amperage of the electrical current (e.g., the amount of electrical current) delivered to the battery 124. In this manner, the battery controller 134 can prevent overcharging the battery and can prevent discharging of the battery if the vehicle is parked for an extended duration.

In some examples, the battery controller 134 may communicate the status (e.g., discharged, partially charged, completely charged, etc.) of the battery 124 to the on-vehicle computing system 132 so that the on-vehicle computing system 132 can display the status of the battery 124 (e.g., on a dashboard display, on a media console, etc.) and/or communication the status of the battery 124 to the charging station 104.

The example on-vehicle computing system 132 of FIG. 1 controls low-level systems (e.g., door lock controls, headlight controls, transmission controls, climate controls, etc.) and/or high-level systems (e.g., an infotainment head unit, a Wi-Fi/Bluetooth system, a cellular communication system, etc.) connected to a controller area network (CAN) bus. For example, the on-vehicle computing system 132 may include a dashboard display, a media center, a center console display, etc. The on-vehicle computing system 132 may also include a data store to store media (e.g., movies, music, television programs, podcasts, etc.), system firmware, navigation data, diagnostic information, data collected by data collection systems (e.g., cameras mounted externally on the vehicle 102, weather data collection, etc.), etc. The example on-vehicle computing system 132 of FIG. 1 is in communication with the battery controller 134. In some examples, the on-vehicle computing system 132 may cause the status of the battery 124 to be displayed on a dashboard display of the vehicle 102. In the illustrated example, the on-vehicle computing system 132 is in communication with the vehicle communication controller 136. In some examples, the on-vehicle computing system 132 may send information (e.g., the status of the battery 124, diagnostic information, etc.) to the charging station 104 via the vehicle communication controller 136 and/or may receive information (e.g., commands, firmware/software updates, media files, etc.) from the charging station 104 via the vehicle communication controller 136.

In the illustrated example of FIG. 1, the vehicle communication controller 136 is in communication with (e.g., connected to) the vehicle communication interface 130 of the vehicle 102. The example vehicle communication controller 136 of the illustrated example sends and receives data via the example vehicle communication interface 130. In some examples, the vehicle communication controller 136 deploys and/or positions the vehicle communication interface 130 to physically engage (e.g. connect to) with the station communication interface 122 of the charging station 104. In some such examples, the vehicle communication controller 136 retracts and/or deploys the vehicle communication interface 130 in response to user input (e.g., user selection of a user-input control element on a control console display of the vehicle 102, etc.). In some examples, the vehicle communication controller 136 deploys the vehicle communication interface 130 automatically when the vehicle communication interface is sufficiently proximate the station communication interface 122 and/or the vehicle charging interface 126 is sufficiently proximate the station charging interface 120. In some examples, the vehicle communication controller 136 retracts the vehicle communication interface 130 automatically in response to an event, such as starting the vehicle, shifting of the transmission of the vehicle 102 out of park, etc. Such automatic disengagement prevents damage to the vehicle communication interface 130 and/or the station communication interface 122 by removing the possibility of the vehicle driving off while the communication interface 130 and the station communication interface 122 are still engaged.

In the illustrated example of FIG. 1, the vehicle communication interface 130 is located on the underside of the vehicle 102. The example vehicle communication interface 130 has a stored position, in which the vehicle communication interface 130 is retracted into the underside of the vehicle 102 so that it does not protrude from the vehicle 102 while the vehicle 102 is in motion. In the illustrated example of FIG. 1, the vehicle communication interface 103 is shown in a deployed position. In some examples, the vehicle communication interface 130 is dimensioned to substantially span the distance of the ground clearance of the vehicle 102 (e.g., the distance between the bottom of the chassis of the vehicle 102 and the bottom of the tires). In some examples, the station communication interface 122 may protrude above the level of the ground such that the vehicle communication interface 130 does not need to extend the entire distance of the ground clearance. Additionally or alternatively, in some examples, the station communication interface 122 may be mechanically moved towards the vehicle communication interface 130.

As shown in the illustrated example of FIG. 1, the vehicle communication interface 130 rotates between the stored position and the deployed position. In some examples, the vehicle communication interface 130 translates vertically between the deployed position and the stored position while remaining in a vertical orientation (e.g., the vehicle communication interface 130 is stored vertically above the underside of the vehicle 102 when not in use). In the illustrated example, the vehicle communication controller 136 causes the vehicle communication interface 130 to move between the stored position and the deployed via an electrical, hydraulic, and/or mechanical actuator coupled to the vehicle communication controller 136. Alternatively, in some examples, the vehicle communication interface 130 is located at the front or rear of the vehicle 102 proximate the vehicle's front or rear bumper. In some such examples, the station communication interface 122 is located in a portion of the charging pad 108 raised above the ground on, for example, a structure that can also acts as a parking stop or barrier (e.g., a turtarrier, a pylon, etc.). In such examples, the vehicle communication interface 130 extends from the front or rear of the vehicle 102 to communicatively couple with the station communication interface 122.

In the deployed position, the example vehicle communication interface 130 is able to physically engage with the example station communication interface 122 of the example charging station 104. In some examples, the vehicle 102 may not stop in a position to directly align the vehicle communication interface 130 (when in the deployed position) with the station communication interface 122. Accordingly, in some examples, the vehicle communication interface 130 is mounted to the vehicle 102 via a track system 133 that enables the vehicle communication interface 130 to move in a plane parallel to the ground on which the vehicle is parked. In some examples, the track system 133 enables the vehicle communication interface 130 to move in two dimensions (e.g., both laterally and front-to-back relative to the vehicle 102). In some examples, the track system 133 provides one-dimensional translation relative to the vehicle 102. In some such examples, the alignment of the vehicle communication interface 130 and the station communication interface 122 in the second dimension is achieved based on the position of the vehicle 102 when it is parked (e.g., front-to-back alignment is achieved when the tires of the vehicle 102 contact a parking stop such as a turtarrier). Additionally or alternatively, in some examples, the vehicle communication interface 130 may be flexible such that a distal end of the vehicle communication interface 130 can be moved into alignment with the station communication interface 122. Additionally or alternatively, in some examples, the vehicle communication interface 130 is connected to the vehicle 102 via a swivel joint to enable rotation about the joint in both lateral and front-to-back directions. In some examples, the distal end of the vehicle communication interface 130 includes a tapered surface that mates with a corresponding tapered surface of the station communication interface 122. In such examples, as the vehicle communication interface 130 is deployed, the tapering of the mating surfaces force the vehicle communication interface 130 into alignment with the station communication interface 122.

In some examples, the vehicle communication interface 130 includes a brush or wiper 131 to interact with the station communication interface 122 as the vehicle communication interface 130 moves into the deployed position. In such examples, the brush or wiper 131 clears debris off of the station communication interface 122 that may otherwise obstruct the connection with the vehicle communication interface 130. In some examples, a separate brush or wiper 131 is attached to the vehicle 130 and/or the vehicle communication interface 130 to clean the interfacing surface of the vehicle communication interface 130 as it is deployed. Additionally or alternatively, in some examples, the vehicle communication interface 130 is protected by a cover when in the stored position to reduce the amount of debris that may otherwise collect on the vehicle communication interface 130.

In the example illustrated in FIG. 1, engaging the vehicle communication interface 130 to the station communication interface 122 of the charging station 104 forms an electromagnetically sealed radio frequency waveguide. A radio frequency waveguide is a structure that provides an electromagnetically isolated rigid and/or flexible path that guides radio frequency communication signals between a radio frequency transmitter and a radio frequency receiver, or between two radio frequency transceivers. In the illustrated example, the vehicle communication interface 130 is a first portion of the radio frequency waveguide and the station communication interface is a second portion of the radio frequency waveguide.

To communicate, each end of the radio frequency waveguide has an antenna to send and/or receive radio frequency communications. When the vehicle communication interface 130 and the station communication interface 122 physically engage, an inner passageway through the vehicle communication interface 130 and the station communication interface 122 is electromagnetically shielded. In such examples, wireless radio frequency communications between the vehicle 102 and the charging station 104 are shielded by the electromagnetically sealed radio frequency waveguide from radio frequency interferences operating outside the electromagnetically sealed radio frequency waveguide. As a result, the vehicle communication controller 136 and the station communication controller 116 may communicate with one another with relatively little interference and relatively low error rates.

In addition to shielding radio frequencies within the radio frequency waveguide, forming the electromagnetically sealed waveguide in the illustrated example enables the vehicle communication controller 136 and the station communication controller 116 to communicate at gigahertz frequencies (e.g., 1, GHz, 2 GHz, 5 GHz, etc.) without interfering with wireless networks using similar frequencies (e.g., IEEE 802.11 wireless networks, Bluetooth wireless networks, Zigbee wireless networks, cordless home phones, etc.). Additionally, the electromagnetically sealed waveguide enables secure transmission of data between the charging station 104 and the vehicle 102. Unlike externally detectable wireless networks (e.g., cellular networks, IEEE 802.11 wireless networks, Bluetooth wireless networks, Zigbee wireless networks, etc.) that can be eavesdropped by wireless devices located nearby, the electromagnetically sealed waveguide provides a physical barrier to reduce (e.g., prevent) eavesdropping on the data communication as the data is transferred between the charging station 104 and the vehicle 102.

In some examples, the internal dimensions of cross-sections of the station communication interface 122 and the vehicle communication interface 130 forming the radio frequency waveguide are based on the frequency of the signals to be transmitted through the radio frequency waveguide. For example, a waveguide with a rectangular cross-section may have a width of one-quarter (0.25) to one-half (0.50) of the wavelength of the transmission frequency to be used and a length of one-half (0.50) to three-quarters (0.75) of the wavelength of the transmission frequency to be used. For example, the rectangular cross-section dimensions of an example radio frequency waveguide for a transmission frequency of 5 GHz is 2.4 cm (width) by 4.2 cm (length) based on the wavelength of a 5 GHz signal (i.e., 6.0 cm).

The example radio frequency waveguide formed by the station communication interface 122 and the vehicle communication interface 130 of the illustrated example are constructed out of a conductive material (e.g., copper, iron, aluminum, etc.) to, for example, electromagnetically shield the internal passageway of the radio frequency waveguide from external radio frequency interference and/or to protect radio frequency communications within the radio frequency waveguide from being exposed outside the radio frequency waveguide.

In some examples, the interior surface of the radio frequency waveguide is plated using a material with high conductivity (e.g., copper, silver, gold, etc.) to decrease signal attenuation due to skin effect. Additionally, the example radio frequency waveguides may be hollow or may be filled with a dielectric material that allows radio frequency transmission between the antenna of the station communication interface 122 and the vehicle communication interface 130.

In the illustrated example of FIG. 1, the vehicle 102 includes an example frame 140, an example body 142, example wheels 144, an example seat 146, and example electric motor 148, an example motor control 150, and an example transmission 152. The example frame 140 is the main structure of the vehicle 102, with the other parts (e.g. the body 142, the wheels 144, the seats 146, the batteries 124, etc.) of the vehicle directly or indirectly mounted to it. In some examples, the vehicle communication interface 130 and/or the vehicle charge interface 126 are attached to the frame 140. In the illustrated example, the body 142 covers the exterior of the vehicle 102 to protect and/or contain the other parts of the vehicle 102.

In the illustrated example, the electric motor 148 may be implemented by a DC electric motor and an AC electric motor. The example electric motor 148 is communicatively coupled to the example motor control 150 and the example transmission 152. The example motor control 150 receives electric current from the batteries 124 to drive the electric motor 148. The example motor control 150 receives signals from a driver (e.g., via a pedal, etc.) to determine what signal (e.g., what rate to supply pulses to a DC electric motor, what frequency to supply power to the AC electric motor, etc.) to communicate to the example electric motor 148. In the illustrated example, electric motor 148 supplies torque to the transmission 152 to drive two or more wheels 144.

Figure 2:
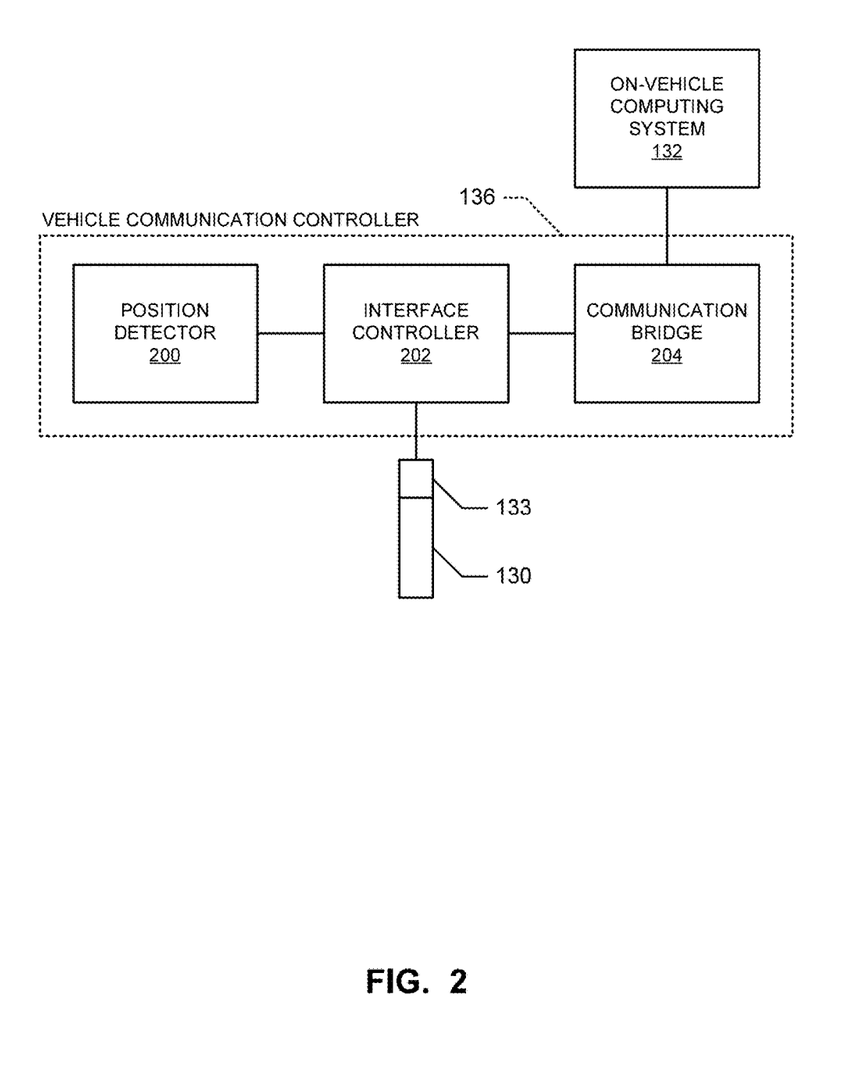
FIG. 2 illustrates an example implementation of the vehicle interface controller of FIG. 1.

FIG. 2 illustrates an example implementation of the vehicle communication controller 136. In the example of FIG. 2, the vehicle communication controller 136 includes an example position detector 200, an example interface controller 202, and an example communication bridge 204. The example position detector 200 of this example detects the position of the vehicle communication interface 130 relative to the charging pad 108 (FIG. 1) and/or the station communication interface 122 of the charging station 104. To this end, the position detector 200 of the illustrated example includes an optical sensor to detect the position of the vehicle communication interface 130 relative to the charging pad 108. To facilitate detection, the charging pad 108 of this example includes markings that are detected by an optical sensor of the position detector 200 to guide the vehicle communication interface 130 into a position to engage with the station communication interface 122 of the charging station 104 (FIG. 1). In some examples, feedback from the position detector 200 is provided to a driver of the vehicle 102 to assist the driver in parking the vehicle 102 in the correct position. Additionally or alternatively, in some examples, the feedback from the position detector 200 is provided to the interface controller 202 to drive the track system 133 described above to move the vehicle communication interface 130 into alignment with the station communication interface 122 after the vehicle 102 has been parked. In other examples, the position detector 200 may detect electrical current induced on the vehicle charging interface 126 by the electromagnetic field 128 to determine that the vehicle charging interface 126 and the vehicle communication interface 130 are proximate the charging pad 108.

To couple to the station interface controller 112, the interface controller 202 of the illustrated example deploys the vehicle communication interface 130 from the stored position to the deployed position. In some examples, as described above, the vehicle communication interface 130 may be mounted to a track system 133 to move independent of the vehicle 102 so that adjustments of the position of the vehicle communication interface 130 may be made to align with the station communication interface 122 when the vehicle 102 is in park without needing to move the entire vehicle 102. In such examples, the interface controller 202 may control movement of the vehicle communication interface 130 to translate (e.g., move left, right, forward and/or back, etc.) the vehicle communication interface 130 relative to the vehicle 102 to align it with the station communication interface 122 of the charging station 104. In addition, in some examples, the interface controller 202 may control a rotation of the vehicle communication interface 130 to align with the station communication interface 122. For example, cross sections of some communication interfaces 122, 130 may be keyed or non-circular, requiring that the communication interfaces 122, 130 be in a particular rotational position or orientation to achieve a mating configuration. In such examples, the interface controller 202 may rotate the vehicle communication interface 130 to rotationally align the vehicle communication interface 130 and the station communication interface 122. In some examples, as described above, the communication interfaces 122, 130 are associated with corresponding tapered surfaces to guide the vehicle communication interface 130 into rotational alignment with the station communication interface 122 as the tapered surfaces mate when the vehicle communication interface 130 is deployed.

In the illustrated example, the interface controller 202 applies sufficient extending pressure on the aligned vehicle communication interface 130 to electromagnetically seal the connection between the vehicle communication interface 130 and the station communication interface 122 of the charging station 104. For example, once the interface controller 202 causes the vehicle communication interface 130 to be deployed via an associated actuator, the interface controller 202 may cause the actuator to apply an additional downward force (e.g., through the vehicle communication interface 130) sufficient to at least partially compress an electromagnetic interference (EMI) gasket between the vehicle communication interface 130 and the station communication interface 122. Compressing the EMU gasket ensured there are no air gaps between the mating surfaces of the vehicle communication interface 130 of the vehicle 102 and the station communication interface 122 of the charging station 104, thereby improving the integrity of the connection.

In some examples, instead of a radio frequency waveguide, the vehicle communication interface 130 includes an inductive-loop-antenna and an NFC or ENFC controller to communicate using NFC transmissions with the charging station 104. In such examples, the station communication interface 122 also includes an NFC loop-inductor-antenna and an NFC controller. In some examples, the NFC controllers and the inductive-loop antennas of the vehicle communication interface 130 and the station communication interface 122 are compliant with ISO/IEC 14443 and/or a similar standard. In some such examples, the interface controller 202 may position the vehicle communication interface 130 within range (e.g., within 20 centimeters, etc.) of the station communication interface 122 of the charging station 104 for NFC communication. Because NFC and ENFC communication is limited to relatively short distances, communication between the charging station 104 and vehicle 102 though NFC or ENFC reduces the distance from which a third-party can eavesdrop on the communication while reducing the mechanical complexity of forming a waveguide as explained above.

In the illustrated example of FIG. 2, the communication bridge 204 manages communication with the on-vehicle computing system 132. The example communication bridge 204 decodes messages from the charging station 104 to be relayed to the on-vehicle computing system 132 (e.g., via the CAN bus, etc.). The example communication bridge 204 marshals, arbitrates, and/or manages messages from the on-vehicle computing system 132 to send to the charging station 204. In some examples, the communication bridge 204 drives the vehicle communication interface 130 (e.g., powers the antenna in the radio frequency waveguide, drives the loop-inductor-antenna of the NFC system, etc.)

While an example manner of implementing the vehicle communication controller 136 of FIG. 1 is illustrated in FIG. 2, one or more of the elements, processes and/or devices illustrated in FIG. 2 may be combined, divided, re-arranged, omitted, eliminated and/or implemented in any other way. Further, the example position detector 200, the example interface controller 202, the example communication bridge 204 and/or, more generally, the example vehicle communication controller 136 of FIG. 1 may be implemented by hardware, software, firmware and/or any combination of hardware, software and/or firmware. Thus, for example, any of the example position detector 200, the example interface controller 202, the example communication bridge 204 and/or, more generally, the example vehicle communication controller 136 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position detector 200, the example interface controller 202, and/or the example communication bridge 204 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle communication controller 136 of FIG. 1 may include one or more elements, processes and/or devices in addition to, or instead of, those illustrated in FIG. 2, and/or may include more than one of any or all of the illustrated elements, processes and devices.

Figure 3:
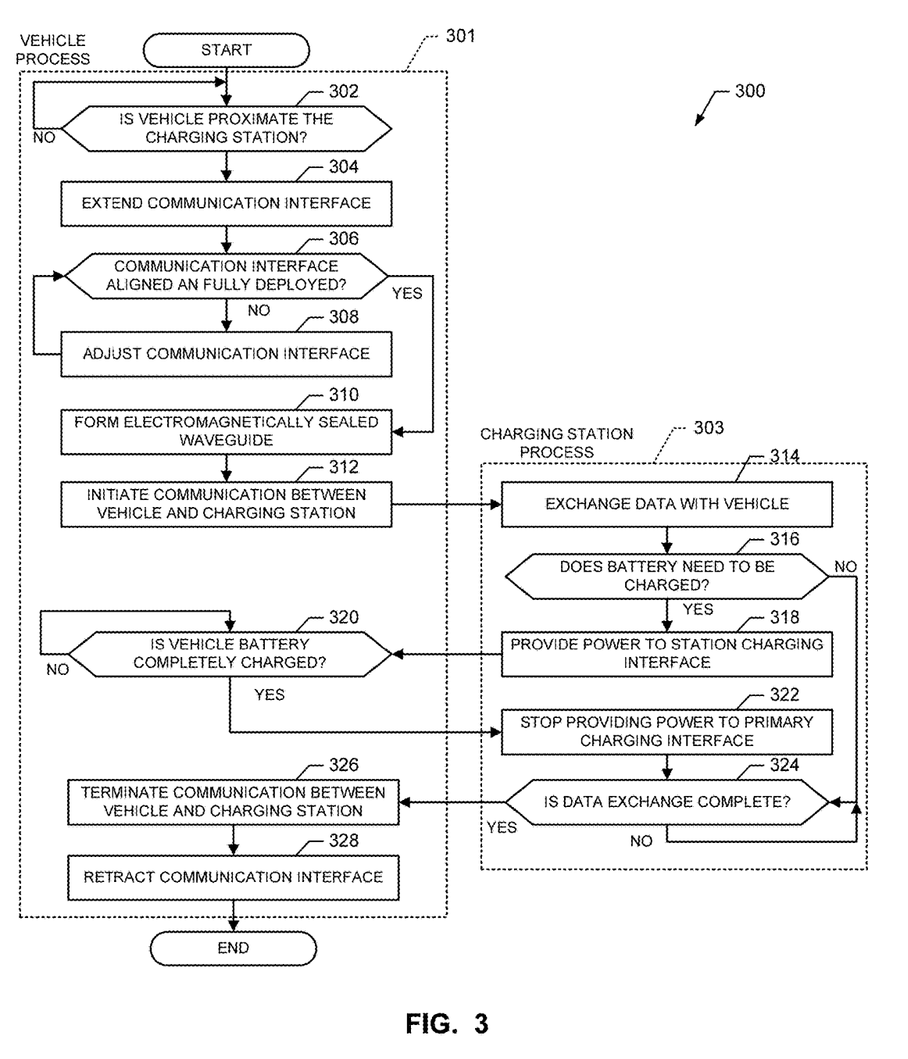
FIG. 3 is a flow diagram representative of example machine readable instructions that may be executed to implement the example vehicle interface controller of FIG. 2 and/or the charging station controller of FIG. 1 to exchange data between the vehicle and the charging station and/or to charge the batteries of the vehicle.

A flowchart representative of example machine readable instructions for implementing the example vehicle communication controller 136 of FIG. 2, and the example charging station 104 of FIG. 1 is shown in FIG. 3. In this example, the machine readable instructions comprise programs for execution by the processor 412 shown in the example processor platform 400 discussed below in connection with FIG. 4 and/or the processor 512 shown in the example processor platform 500 discussed below in connection with FIG. 5. The programs may be embodied in software stored on a tangible computer readable storage medium such as a CD-ROM, a floppy disk, a hard drive, a digital versatile disk (DVD), a Blu-ray disk, or a memory associated with the processors 412, 512, but the entire program and/or parts thereof could alternatively be executed by a device other than the processors 412, 512 and/or embodied in firmware or dedicated hardware. Further, although the example program is described with reference to the flowchart illustrated in FIG. 3, many other methods of implementing the example vehicle communication controller 136 and the example charging station 104 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example vehicle communication controller 136 of FIGS. 1 and 2 and/or the charging station 104 of FIG. 1 to exchange data between the vehicle 102 (FIG. 1) and the charging station 104 and/or to charge the battery 124 (FIG. 1) of the vehicle 102. The flow diagram 300 of FIG. 3 is shown having an example vehicle process 301 and an example charging station process 303. The vehicle process 301 of the illustrated example is performed by the vehicle communication controller 136. The charging station process 303 of the illustrated example is performed by the charging station 104.

Initially, at block 302 in the vehicle process 301, the example position detector 200 (FIG. 2) determines whether the vehicle 102 is proximate the charging station 104. For example, the position detector 200 can determine the vehicle charging interface 126 (FIG. 1) of the vehicle 102 is proximate the station charging interface 120 (FIG. 1) of the charging station 104. In some examples, the position detector 200 may determine (e.g. via an optical sensor, via a current sensor, etc.) that vehicle charging interface 126 is above the station charging interface 120. If the vehicle 102 is proximate the charging station 104, program control advances to block 304. Otherwise, if the vehicle 102 is not proximate the charging station 104, program control returns to block 302. At block 304, the interface controller 202 (FIG. 2) extends the vehicle communication interface 130 (FIG. 1).

At block 306, the example position detector 200 determines whether the example vehicle communication interface 130 is fully deployed and aligned with the station communication interface 122 (FIG. 1). The example vehicle communication interface 130 is fully deployed and aligned with the example station communication interface 122 when the vehicle communication interface 130 is in the deployed position and the cross-section of the vehicle communication interface 130 is in mating alignment with the cross-section of the station communication interface 122. If the example vehicle communication interface 130 is fully deployed and aligned with the station communication interface 122, program control advances to block 310. Otherwise, if the example vehicle communication interface 130 is not fully deployed and aligned with the station communication interface 122, program control advances to block 308. At block 308, the example interface controller 202 adjusts (e.g., translates, rotates, etc.) the example vehicle communication interface 130 to align the vehicle communication interface 130 with the station communication interface 122. In some examples, the interface controller 202 adjusts the vehicle communication interface via a track system 133 (FIG. 1). At block 310, the example interface controller 202 causes the vehicle communication interface 130 to extend toward the station communication interface 122 with sufficient force to form an electromagnetically sealed connection between the vehicle communication interface 130 and the station communication interface 122 of the charging station 104. At block 312, the example communication bridge 204 (FIG. 2) initiates communication with the example charging station 104.

Referring now to the example charging station process 303, at block 314, the example station communication controller 116 (FIG. 1) sends data to and/or receives data from the vehicle 102. In some examples, the data received at the station communication controller 116 from the vehicle 102 includes the status of the battery 124 (e.g., discharged, partially charged, completely charged, etc.) of the vehicle 102. Additionally, the station communication controller 116 may send data (e.g., media files, firmware/software updates, diagnostic data, navigation data, etc.) to and/or receive data from the on-vehicle computing system 132 of the vehicle 102. At block 316, the example communication controller 116 determines whether the example battery 124 is to be charged based on the status of the example battery 124 received, for example, at block 314. For example, the communication controller 116 may determine that the battery 124 is not to be charged if the status of the battery 124 is "completely charged." If the example battery 124 is to be charged, program control advances to block 318. Otherwise, if the battery 124 is not to be charged, program control advances to block 324. At block 318, the battery charge interface 114 provides power to the station charging interface 120.

At block 320 of the example vehicle process 301, the communication bridge 204 of the vehicle 102 determines if the battery 124 is completely charged or partially charged. For example, the communication bridge 204 may receive a battery status update from the battery controller 134 (FIG. 1) via the on-vehicle computing system 132. If the battery 124 is completely charged, program control advances to block 322 in the example charging station process 303. Otherwise, if the battery 124 is not completely charged, program control returns to block 320 so that the communication bridge 204 can continue to monitor the status of the battery 124. At block 322, the example battery charger interface 114 stops providing power to the example primary charging interface 120 when the battery 124 is fully charged.

At block 324, the example station communication controller 116 determines whether a data exchange with the vehicle 102 is complete. For example, the station communication controller 116 may determine the data exchange is complete when information has been completely received at the charging station 104 from the vehicle 102, or when information has been completely transferred from the charging station 104 to the vehicle 102. If the data exchange between the vehicle 102 and the charging station 104 is complete, program control advances to block 326 of the example vehicle process 301. Otherwise, if the data exchange between the vehicle 102 and the charging station 104 is not complete, program control returns to block 324. At block 326 of the example vehicle process 301, the example communication bridge 204 terminates the communication between the vehicle 102 and the charging station 104. At block 328, the example interface controller 202 retracts the vehicle communication interface 130. The example program 300 then ends.

Figure 4:
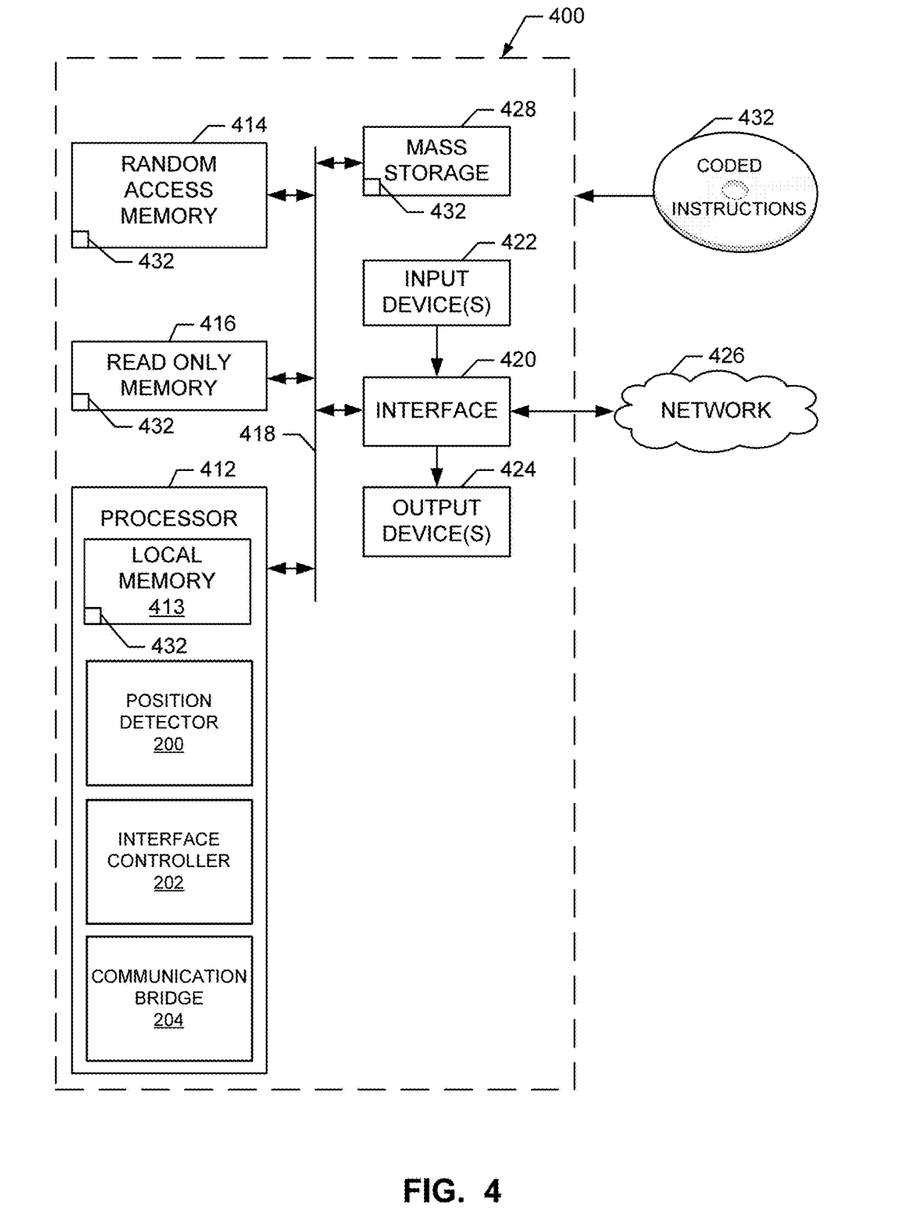
FIG. 4 is a block diagram of an example processor system structured to execute some of the example machine readable instructions represented by FIG. 3 to implement the example vehicle communication controller of FIGS. 1 and/or 2.

FIG. 4 is a block diagram of an example processor platform 400 structured of to execute the instructions of FIG. 3 to implement the example vehicle communication controller 136 of FIG. 1. The processor platform 400 can be, for example, a server, a personal computer, a workstation, a single-board microcontroller, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. In the illustrated example, the processor 412 includes an example apposition detector 200, an example interface controller 202, and an example communication bridge 204.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the example flow diagram 300 of FIG. 3 may be stored in the mass storage device 428, in the volatile memory 414, in the non-volatile memory 416, and/or on a removable tangible computer readable storage medium such as a CD or DVD.

Figure 5:
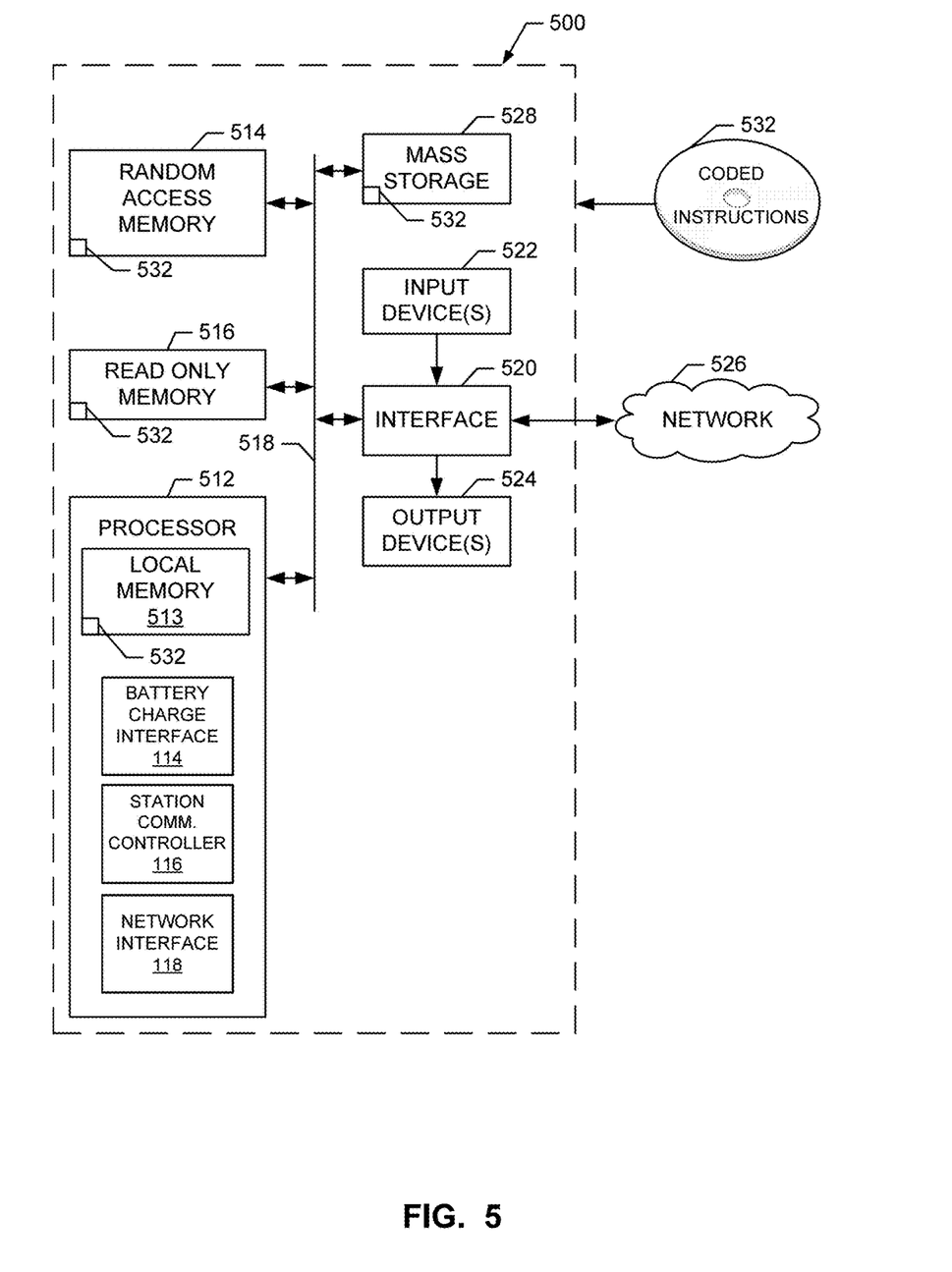
FIG. 5 is a block diagram of an example processor system structured to execute some of the example machine readable instructions represented by FIG. 3 to implement the example charging station controller of FIG. 1.

FIG. 5 is a block diagram of an example processor platform 500 structured of to execute the instructions of FIG. 3 to implement the example charging station 104 of FIG. 1. The processor platform 500 can be, for example, a server, a personal computer, a workstation, a single-board microcontroller, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. In the illustrated example, the processor 512 includes an example battery charge interface 114, an example station communication controller 116, and an example network interface 118.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the example flow diagram 300 of FIG. 3 may be stored in the mass storage device 528, in the volatile memory 514, in the non-volatile memory 516, and/or on a removable tangible computer readable storage medium such as a CD or DVD.

From the foregoing, it will be appreciated that examples have been disclosed which enable high speed communications through a shielded connection between a vehicle and a charging station without interfering with wireless networks operating on similar frequencies and without frequency interference from external sources adversely affecting the communications between the vehicle and the charging station. Examples have been disclosed that provide a secure method of transferring data between a charging station and a vehicle that is resistant to eavesdropping. Examples have been disclosed that provide low-error rates between the charging station and the vehicle thereby improving the accuracy of important data transmissions, such as software/firmware updates. In addition, it will be appreciated that examples have been disclosed that facilitate charging of an electric vehicle and data communication without requiring the driver of the vehicle to plug a connector into the vehicle. Furthermore, in disclosed examples, the shielded connection is formed automatically when the vehicle is parked at a charging station, thereby facilitating the advantages above without user input.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An apparatus for use on a vehicle to facilitate charging a battery of the vehicle, comprising:
 a first charging interface to communicatively couple with a second charging interface of a charging station;
 a first communication interface actuatable between a stored position in the vehicle and a deployed position, the first communication interface including a first radio frequency waveguide, the first radio frequency waveguide to physically engage a second radio frequency waveguide of a second communication interface of the charging station to form an electromagnetically sealed waveguide, the electromagnetically sealed waveguide to guide radio frequency communication signals between the first communication interface and the second communication interface; and
 an interface controller to automatically deploy the first communication interface from the stored position in response to at least one of the first charging interface being proximate the second charging interface, or the first communication interface being proximate the second communication interface.

2. The apparatus as defined in claim 1, wherein the electromagnetically sealed waveguide is to shield radio frequency communications inside the electromagnetically sealed waveguide from radio frequency interference outside of the electromagnetically sealed waveguide.

3. The apparatus as defined in claim 1, wherein the first communication interface is in communication with a controller area network bus of the vehicle.

4. The apparatus as defined in claim 1, wherein the first charging interface is to inductively couple with the second charging interface of the charging station to charge a battery of the vehicle.

5. The apparatus as defined in claim 1, wherein the second charging interface includes a primary inductive coil to induce an electrical current into a secondary inductive coil of the first charging interface.

6. The apparatus as defined in claim 1, wherein the first communication interface is mounted to the vehicle via a track system, the track system to facilitate alignment of the first radio frequency waveguide to the second radio frequency waveguide.

7. The apparatus as defined in claim 1, further including a wedge structure protruding from the distal end of the first communication interface to move debris when the first communication interface is deployed.

8. A vehicle comprising:
 a battery;
 a first charging interface to communicatively couple with a second charging interface of a charging station, the first charging interface communicatively coupled to the battery;
 an on-board computing system commutatively coupled to the battery;
 a first communication interface communicatively coupled to the on-board computing system, the first communication interface actuatable between a stored position in the vehicle and a deployed position, the first communication interface including a first radio frequency waveguide, the first radio frequency waveguide to mate with a second radio frequency waveguide of a second communication interface of the charging station to form an electromagnetically sealed waveguide, the electromagnetically sealed waveguide to facilitate radio frequency communication signals between the first communication interface and the second communication interface of the charging station; and
 an interface controller to automatically deploy the first communication interface from the stored position in response to at least one of the first charging interface being proximate the second charging interface, or the first communication interface being proximate the second communication interface.

9. The vehicle as defined in claim 8, wherein the electromagnetically sealed waveguide is to shield radio frequency communications inside the electromagnetically sealed waveguide from radio frequency interference outside of the electromagnetically sealed waveguide.

10. The vehicle as defined in claim 8, wherein the first communication interface is in communication with a controller area network bus of the vehicle.

11. The vehicle as defined in claim 8, wherein the first charging interface is to inductively couple with the second charging interface of the charging station to charge the battery of the vehicle.

12. The vehicle as defined in claim 8, wherein the second charging interface includes a primary inductive coil to induce an electrical current into a secondary inductive coil of the first charging interface.

13. The vehicle as defined in claim 8, wherein the first communication interface is mounted to the vehicle via a track system, the track system to facilitate alignment of the first radio frequency waveguide to the second radio frequency waveguide.

14. The vehicle as defined in claim 8, further including a wedge structure protruding from the distal end of the first communication interface to move debris when the first communication interface is deployed.

15. The apparatus as defined in claim 1, wherein the interface controller is to automatically retract the first communication interface from the deployed position in response to at least one of starting the vehicle, shifting a transmission of the vehicle out of park or releasing a parking brake of the vehicle.

16. The vehicle as defined in claim 8, wherein the interface controller is to automatically retract the first communication interface from the deployed position in response to at least one of starting the vehicle, shifting a transmission of the vehicle out of park or releasing a parking brake of the vehicle.

* * * * *